May 22, 1934.　　　　A. LOUŠA　　　　1,960,160
WALL AND PARTITION
Filed Nov. 22, 1933

INVENTOR
Antonín Louša,
By Watson, Coit-Morse & Grindle
ATTYS.

Patented May 22, 1934

1,960,160

UNITED STATES PATENT OFFICE 1,960,160

WALL AND PARTITION

Antonin Louša, Skalice at Ceska Lipa, Czechoslovakia

Application November 22, 1933, Serial No. 699,273
In Czechoslovakia October 15, 1932

1 Claim. (Cl. 72—31)

The invention relates to a lining for the walls of rooms, such as for example bath-rooms, kitchens, corridors and the like, as well as a construction for separate walls or partitions.

Heretofore, such linings or separate walls have been made from plates or slabs of fireclay, glass or the like. A disadvantage of such linings is the troublesome and complicated processes required for joining together the tiles or plates, as well as their attachment to the wall, the manufacturing costs being thereby considerably increased. In addition, perfectly flat surfaces can only be obtained with difficulty. Glass tiles, in addition to the disadvantages mentioned in the foregoing, suffer from the further disadvantage that, in the case they are of large dimensions, they are somewhat uneven, and that, if a large number of tiles is employed, it is impossible to obtain a homogeneous shade of colour. Also, when making separate walls exclusively of tiles or plates, very considerable difficulties are encountered in joining the tiles or plates to each other.

These disadvantages are eliminated by the present invention which provides wall linings or wainscotings made of glass rods, glass bars or glass tubes.

According to the invention, glass rods of suitable length and thickness are assembled in closely adjacent relationship by inserting their free ends into trough-shaped retaining guideways, for example, guideways comprising U-shaped metal supports.

To prevent any play which would allow the rods to shake, the ends of the latter are secured in the guideways by cement, or, as shown in Figure 4 of the drawing, the rods are applied to the plastering of the wall while it is still moist and soft, so that they are partly pressed into the wall, and in this case a better adhesion may be secured by grooving, channelling or roughening the side of each glass rod adjacent the wall. In the case of linings for shop windows, which do not require to be resistant to the action of water, or where the final lining may sometimes be applied to a cheaper covering of wood, corrugated paper may be placed underneath the surfaces of the rods, thereby ensuring a firm seating of the rods in the guideways.

The accompanying drawing shows constructional examples of the invention.

Figure 1:
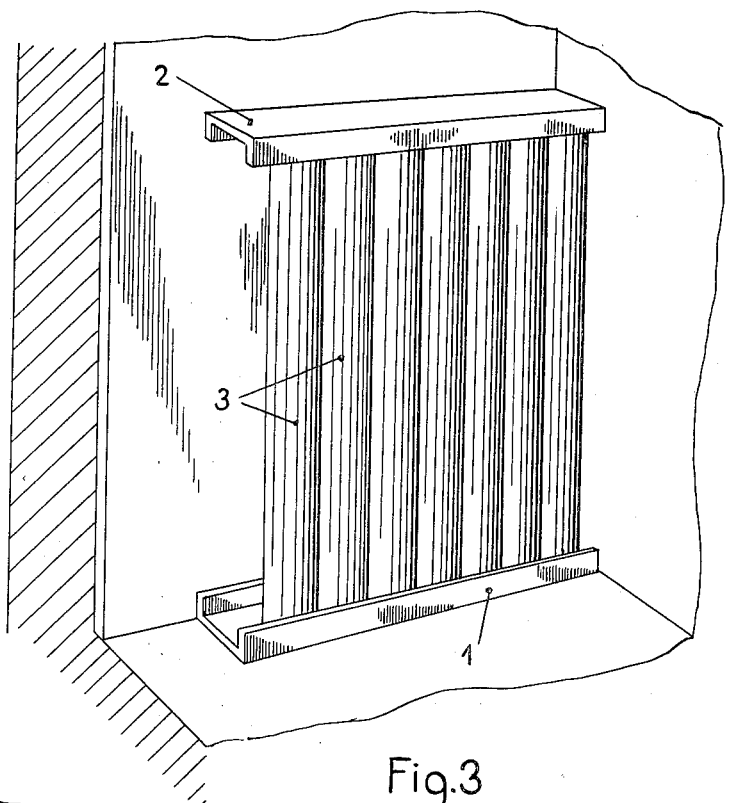
Figure 1 is a perspective view of the lining, partly in section.
Figure 2:
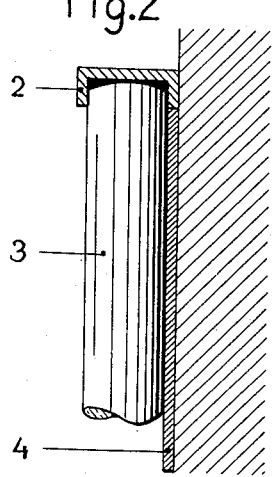
Figure 2 is a vertical section through part of a wall and a guideway.

According to Figure 1, one trough guideway 1 is disposed on the floor and the second guideway 2 at a height corresponding to the height of the lining or wainscoting. The rods 3 are then inserted in succession into the guideways. Underlaying of the wall of rods with pasteboard 4 or the like is effected before inserting the rods.

Figure 3:
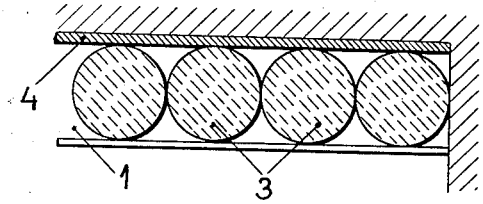
Figure 3 is a horizontal section through a lining wall of round rods.
Figure 4:
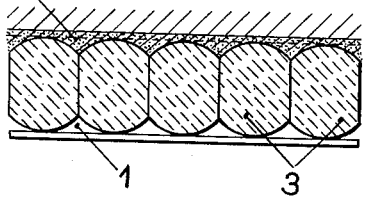
Figure 4 is a horizontal section through a wall of partly ground rods.

The rods may be quite smooth (Figure 3) or may be ground on diametrically opposite faces, so as to produce flat surfaces of contact as shown in Figure 4. This latter construction is more particularly advantageous in the case of wall linings which are to be washed, that is to say, which must be impermeable to water, for example for kitchens, bath-rooms, laundries and the like. Impermeability is attained by joining the rods 3 by a suitable adhesive or cement applied to the said surfaces of contact. The front and rear faces of the rods in Figure 4 are arcuate in cross section and this, of course, provides an ornamental feature for the front surface and the necessary irregularity to serve as a binding means for contact with the plaster on the rear surface.

Various cross-sections may be selected for the rods. Hollow tubes are also suitable. Preferably, however, smooth round rods (if desired ground on two sides) which have a high lustre and allow splendid colour and light effects to be obtained, will be employed.

Since glass rods of any colour constitute an extremely cheap building material and since, after attaching the guideways, the lining can be assembled with extreme rapidity, the building costs are a minimum. Repairs can also be carried out conveniently since damaged rods can readily be replaced by new rods. The lining is extremely resistant to moisture, cold, and heat, and its colour is permanent.

It is evident that independent walls, partitions, linings for example on balconies of houses, stair landings and the like, panels on furniture and so forth may also be made in the manner described. Rods of suitable thickness are simply inserted into guideways and secured therein by means of a suitable cement. Where the term "rod" is used in the appended claim it is to be understood in the generic sense as including tubes and bars.

I claim:

A wall having an ornamental and sanitary wainscoting applied thereto, said wainscoting comprising a series of parallel elongated glass rods having their adjacent sides flattened and disposed in contact with each other and the front and rear surfaces of said rods being arcuate in cross section, a channel member forming a base to receive the lower edge of said series of rods between its flanges, an inverted channel member arranged to similarly receive the upper edge of said series, and a thin layer of plaster disposed between said wall and said series of rods.

ANTONÎN LOUŠA.